Figure 1:
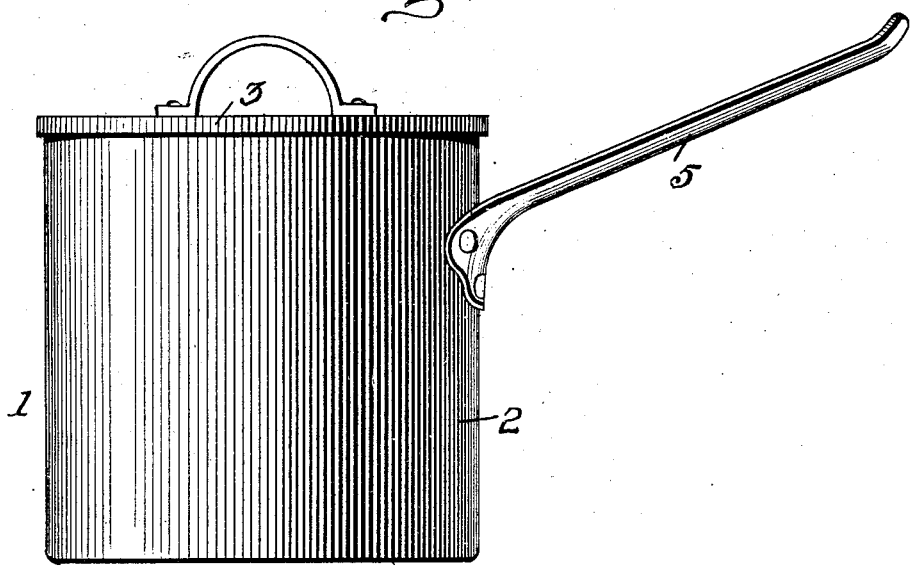

No. 869,099. PATENTED OCT. 22, 1907.
T. MATTESON.
STEAMER.
APPLICATION FILED MAR. 21, 1906.

Witnesses
Samuel T. Payne.
A. H. Butler

Inventor
T. Matteson,
by A. H. Everett Co.
Attorneys

UNITED STATES PATENT OFFICE.

THOMAS MATTESON, OF ARMBRUST, PENNSYLVANIA.

STEAMER.

No. 869,099.  Specification of Letters Patent.  Patented Oct. 22, 1907.

Application filed March 21, 1906. Serial No. 307,210.

*To all whom it may concern:*

Be it known that I, THOMAS MATTESON, a citizen of the United States of America, residing at Armbrust, in the county of Westmoreland and State of Pennsylvania, have invented certain new and useful Improvements in Steamers, of which the following is a specification, reference being had therein to the accompanying drawing.

This invention relates to certain new and useful improvements in cooking utensils, and the invention relates more particularly to a utensil employed for steaming vegetables.

The primary object of this invention is to provide a novel form of cooking utensil in which vegetables may be steamed, without contacting with the boiling water contained within the utensil for generating the steam.

Another object of this invention is to provide a utensil which is particularly adapted for steaming vegetables, but may be readily used for other purposes, by removing a portion of the utensil.

A further object of this invention is to provide a handy and complete receptacle for steaming bread, heating and re-warming cakes, meats and vegetables, and numerous foods that are prepared in a culinary department.

A still further object of this invention is to provide a novel cooking utensil that may be easily and quickly cleansed, and maintained in a perfect sanitary condition.

Briefly described my improved cooking utensil consists of a receptacle having a suitable handle. In the receptacle is detachably mounted a partition which forms the receptacle into two compartments, the lowermost compartment being adapted to contain boiling water, while the uppermost compartment contains the vegetables to be steamed. The partition which is detachably mounted within the receptacle is provided with a central tubular perforated stem into which the steam generated by the boiling water within the lowermost compartment is adapted to pass and contact with the vegetables surrounding the stem.

The detail construction entering into my invention will be hereinafter more fully described and claimed, and referring to the drawing accompanying this application, like numerals of reference designate corresponding parts throughout the several views, in which:—

Figure 2:
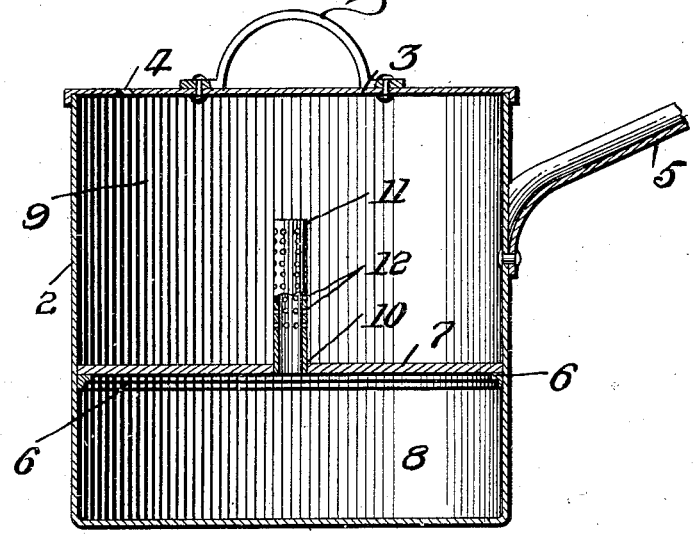

Figure 1 is a side elevation of a utensil constructed in accordance with my invention, and Fig. 2 is a vertical sectional view.

To put my invention into practice, I construct my improved cooking utensil of a pot-shaped receptacle 1 having cylindrical walls 2. The receptacle is provided with a flanged lid 3 having an opening 4 formed therein, to permit of steam passing out of the receptacle, after it has served its purpose. The lid may be provided with a conventional form of handle (as shown). The receptacle is provided with a conventional form of handle 5 whereby the receptacle may be easily handled.

The inner sides of the walls 2 of the receptacle are provided with an annular collar or flange 6 which is suitably secured to the walls 2 of the receptacle a short distance above the bottom thereof. Resting upon the annular collar or flange 6 is an imperforate partition 7 which divides the receptacles into a lower compartment 8 and an upper compartment 9. The partition 7 is provided with a central opening 10 and in said opening is mounted a tubular stem 11 having the portion adjacent to the partition imperforate and with perforations 12 formed in the upper portion thereof. The stem is adapted to extend upwardly into the compartment 9 and convey steam from the lower compartment 8 into the upper compartment 9. The tubular stem 11 being imperforate at the lower portion or adjacent to the partition, the upwardly flowing steam will not flow laterally into the material resting upon the partition, but will be carried upwardly above the partition and not come directly in contact therewith until it reaches the perforation in the tubular stem. By this means the action of the steam is downwardly upon the material, as will be obvious.

In practice the boiling water or the water to be boiled is placed in the lower compartment 8, while the vegetables to be steamed are placed within the upper compartment 9 upon the partition 7. As the water boils and steam is generated, the steam passes upwardly within the stem 11, through the perforations 12 and percolates through the vegetables contained within the compartment 9. For instance, when rice is being steamed, the rice will be thoroughly protected from the water contained within the lower compartment 8 while the steam generated by the cooling water will be thoroughly distributed through the rice, to properly cook the same. The steam after it has served its purpose within the compartment 9 passes through the opening 4 of the lid 3 to escape to the atmosphere.

The cooking utensil in its entirety may be constructed of granite, galvanized iron, tin or the like suitable material, and I do not care to confine myself to the size, shape or minor details of construction, as such changes as are permissible by the appended claims, may be resorted to without departing from the spirit and scope of the invention.

What I claim and desire to secure by Letters Patent, is:—

A steam heater comprising a receptacle, an annular flange secured to the inner face of and below the central horizontal line of said receptacle, a partition removably mounted upon said flange and abutting against the inner face of the receptacle, said partition provided with a centrally-disposed opening and further having the remaining portion thereof imperforate, said partition dividing said receptacle into an upper and a lower compartment, a vertically-extending tubular member projecting in the opening of said partition and providing means for establishing communication between the two compartments, said member having that portion adjacent to the partition imperforate and further having the upper portion thereof provided with a plurality of transversely-extending apertures, said tubular member of a length as to terminate approximately mid-way between the central horizontal line and the top of said receptacle, a flanged cover mounted upon the receptacle and provided with an opening and a handle, and a handle secured to the receptacle.

In testimony whereof I affix my signature in the presence of two witnesses.

THOMAS MATTESON.

Witnesses:
WM. C. HEITZ,
E. E. POTTER.